Figure 3:
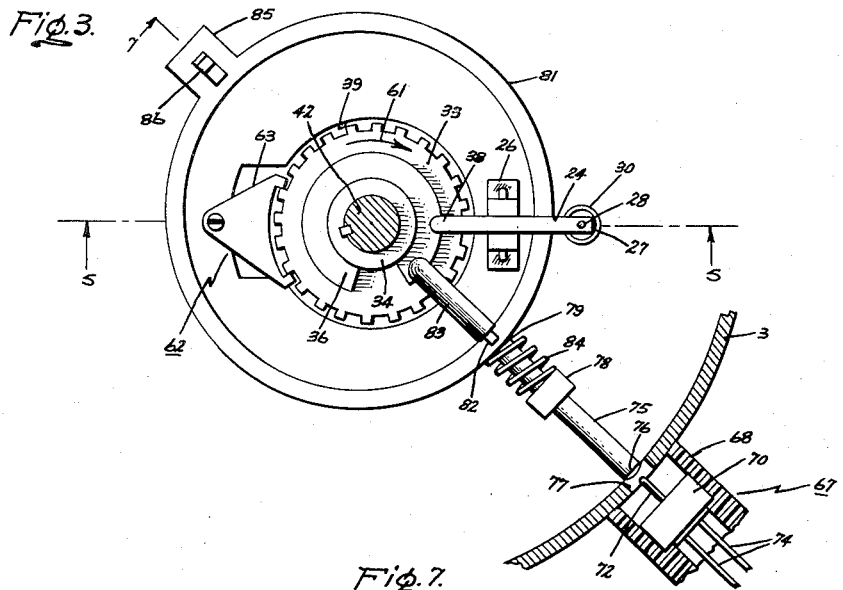

March 13, 1962 J. L. D. MORRISON 3,024,718
HOT BEVERAGE-MAKING DEVICE
Filed Jan. 5, 1959 3 Sheets-Sheet 1
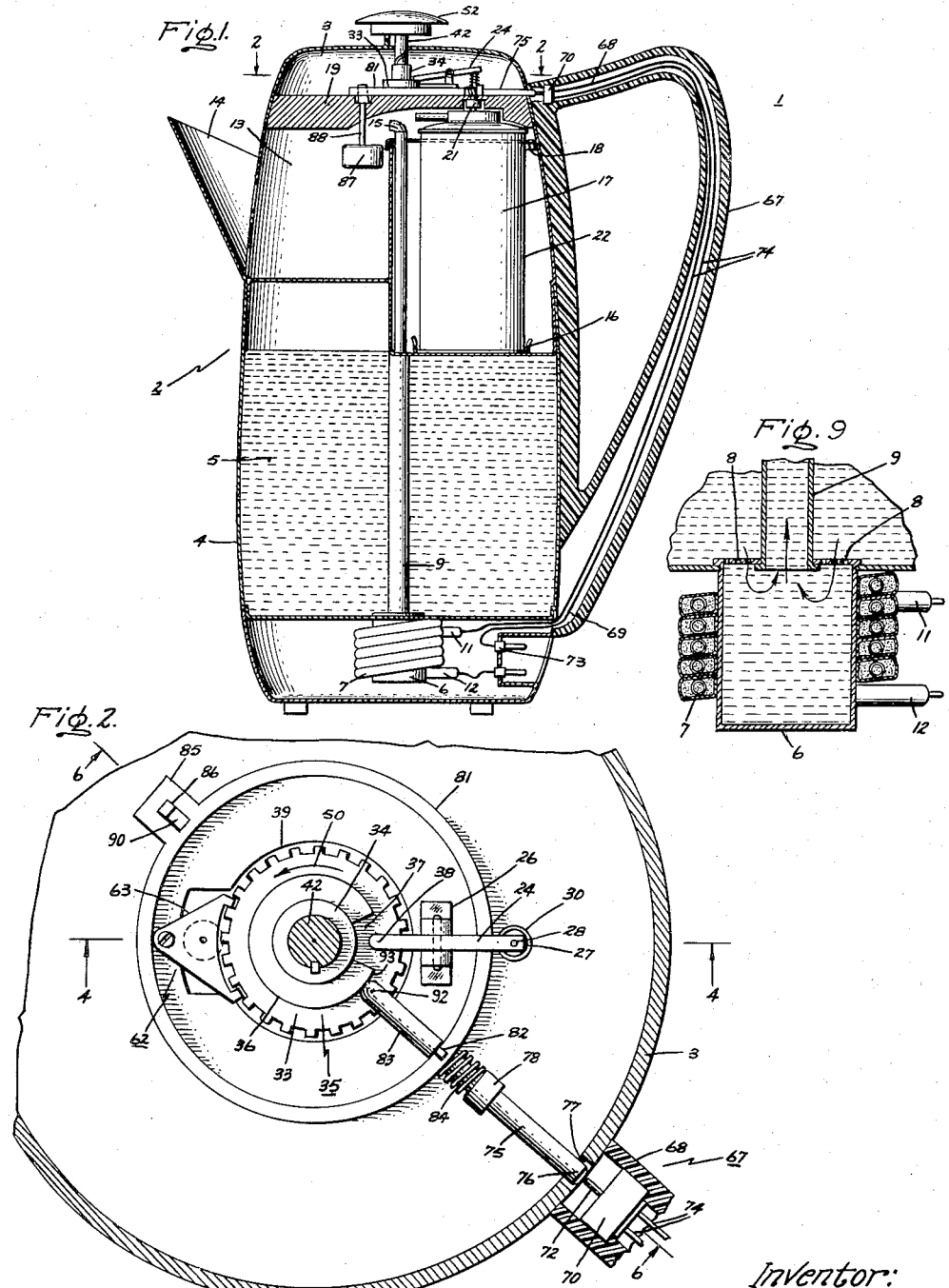
Inventor:
James L. D. Morrison,
by Gust & Irish
Attorneys.

Inventor:
James L. D. Morrison,
by Just & Irish
Attorneys

March 13, 1962  J. L. D. MORRISON  3,024,718
HOT BEVERAGE-MAKING DEVICE
Filed Jan. 5, 1959  3 Sheets-Sheet 3

Inventor:
James L. D. Morrison,
by Gust & Irish
Attorneys

United States Patent Office 3,024,718
Patented Mar. 13, 1962

3,024,718
HOT BEVERAGE-MAKING DEVICE
James L. D. Morrison, 7551 Melrose Ave.,
Los Angeles, Calif.
Filed Jan. 5, 1959, Ser. No. 785,050
12 Claims. (Cl. 99—275)

This invention relates generally to hot beverage-making and dispensing devices, and more particularly to a device employing a pressurized dispenser of instant beverage-making material for automatically making a measured quantity of hot beverage from such material and for dispensing the same.

Hot beverages, particularly coffee, have in the past been made either by brewing the same by any of several well known methods from ground, roasted coffee beans, or by mixing so-called "instant" coffee with an appropriate quantity of hot water; in the past, such "instant" coffee has been available in both powdered and liquid-concentrate form, in conventional containers. Many forms of "automatic" coffee makers have been proposed and are commercially available for brewing coffee in various quantities from conventional ground coffee. In addition, devices have been proposed, such as that described and illustrated in my copending continuation-in-part patent application Serial Number 472,442, filed December 1, 1954, now Patent No. 2,883,921, issued April 28, 1959, for automatically making hot coffee, a cup at a time, from "instant" coffee.

It is now proposed to package instant coffee, both in powdered and liquid-concentrate form, in pressurized dispensing containers.

It is therefore desirable to provide a device employing such a pressurized dispenser of instant beverage-making material (such as coffee, cocoa, or tea) for automatically properly proportioning and mixing the instant-beverage making material and hot water, and for dispensing the same in measured quantities. It is further desirable that such a device lend itself for use as a home appliance.

It is therefore a general object of my invention to provide a hot beverage-making and dispensing device employing a pressurized dispenser of instant beverage-making material.

Another object of my invention is to provide a device employing a pressurized dispenser of instant beverage-making material for automatically properly proportioning such instant beverage-making material and hot liquid and for dispensing the same in measured quantities.

A further object of my invention is to provide a device suitable for use as a home appliance for automatically making an individual serving of hot beverage and for dispensing the same, the basic ingredients of said hot beverage being contained in a pressurized dispenser of instant beverage-making material.

Further objects and advantages of my invention will become apparent by reference to the following description and the accompanying drawings, and the features of novelty which characterize my invention will be pointed out with particularity in the claims annexed to and forming a part of this specification.

My invention in its broader aspects provides a device having a liquid (such as water) supply reservoir with means for heating the liquid, a beverage mixing chamber, and means communicating between the reservoir and the chamber for supplying liquid thereto. Means are provided adapted to accommodate a pressurized dispenser of instant beverage-making material so that the same will discharge the material into the mixing chamber responsive to actuation of its valve means, and manually actuated means are provided for initiating discharge of the material and the supply of water into the chamber and for respectively terminating the same after predetermined times thereby to mix the beverage in the chamber. In accordance with a specific embodiment of my invention, I provide manually actuating means for operating the dispenser to initiate discharge of the material therefrom into the container, and timing means arranged to terminate the discharge of material after a predetermined time, thereby to discharge a predetermined quantity of the material into the chamber, and means are further provided for terminating the supply of liquid to the mixing chamber responsive to a predetermined fluid level therein.

Figure 7:
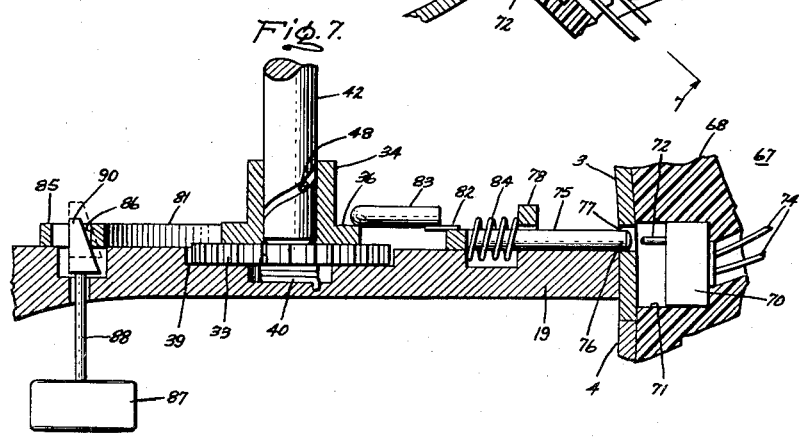
Figure 8:
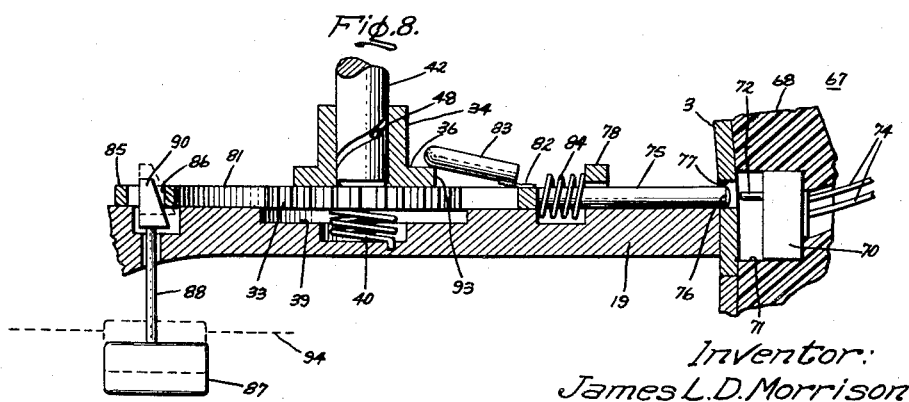
Figure 4:
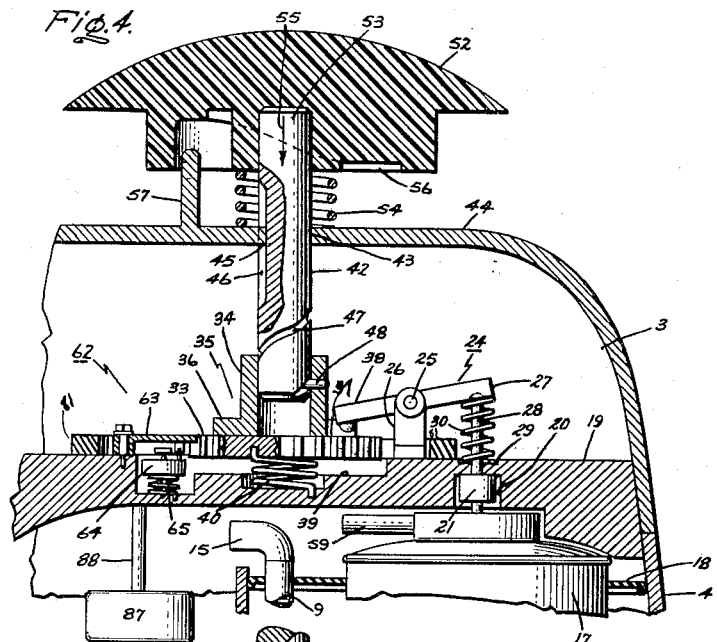
Figure 5:
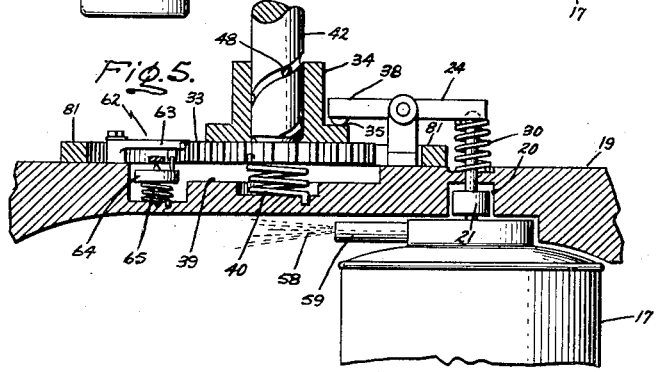
Figure 6:
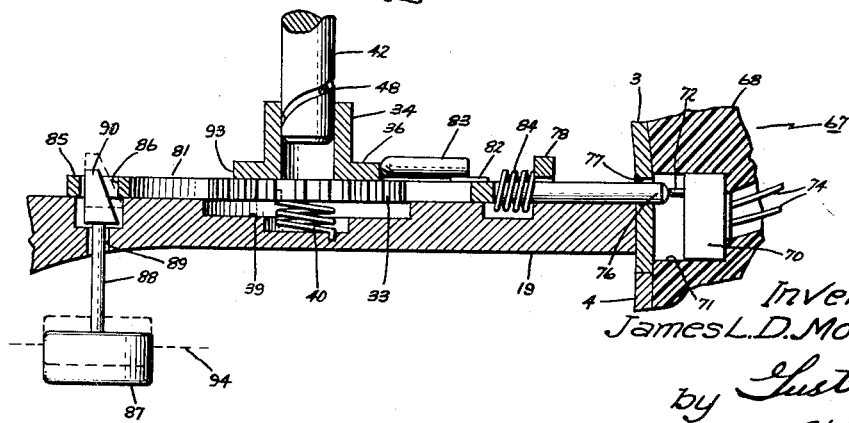

In the drawings:
FIG. 1 is a cross-sectional view showing the improved hot beverage-making device of my invention;
FIG. 2 is a fragmentary cross-sectional view taken along the line 2—2 of FIG. 1 showing the operating mechanism in its normal "at rest" position;
FIG. 3 is a fragmentary cross-sectional view similar to FIG. 2 showing the mechanism in its "actuated" position;
FIG. 4 is a fragmentary cross-sectional view taken along the line 4—4 of FIG. 2;
FIG. 5 is a fragmentary cross-sectional view taken along the line 5—5 of FIG. 3;
FIG. 6 is a fragmentary cross-sectional view taken along the line 6—6 of FIG. 2;
FIG. 7 is a fragmentary cross-sectional view taken along the line 7—7 of FIG. 3, showing a part of the mechanism at the beginning of its "actuated" position;
FIG. 8 is a fragmentary cross-sectional view similar to FIG. 7 showing the same part of the mechanism during the remainder of its "actuated" position; and
FIG. 9 is a fragmentary cross-sectional view further illustrating the liquid heating mechanism of FIG. 1.

Referring now to the figures of the drawing, my improved hot beverage-making device, generally identified as 1, comprises a housing 2 divided into separable upper and lower sections 3 and 4. Lower housing section 4 contains a water supply reservoir 5 adapted to contain a desired quantity of water, for example eight (8) to twelve (12) cups.

Referring now particularly to FIG. 9 in addition to FIG. 1, disposed at the bottom of reservoir 5 is a cup-shaped receptacle 6 having a conventional heating coil 7 arranged on its exterior, as shown. Receptacle 6 communicates with reservoir 5 by means of openings 8 and a conduit or pump 9 extends upwardly therefrom, as shown. It will now be seen that water from reservoir 5 will flow into receptacle 6 through the openings 8 and it will be readily understood that when coil 7 is energized through its leads 11 and 12 (as will be hereinafter more fully described), the water in the receptacle 6 is heated and is forced upwardly in conduit 9; as the heated water is forced upwardly in conduit 9, more water of course is drawn into receptacle 6 from reservoir 5 through openings 8.

Disposed above reservoir 5 is a beverage mixing chamber 13, preferably proportioned to accommodate the quantity of beverage desired to be dispensed, such as one (1) cup. A conventional pouring spout 14 communicates with mixing chamber 13 and it will be seen that conduit 9 from the receptacle 6 extends upwardly and has a suitable elbow 15 disposed to discharge hot water from the conduit 9 into the mixing chamber 13. A suitable fixture 16 is also provided into the lower housing section 4 for accommodating a pressurized dispensing container 17 of instant beverage-making material, such as liquid-concentrate coffee. A resilient gasket member 18 is preferably provided extending between the wall of the mixing chamber 13 and the inner wall of housing section 4 and having pressurized dispenser 17 extending through an opening therein thereby to prevent hot water from the discharge nozzle 15 from inadvertently splashing into the chamber 22 in which dispenser 17 is positioned. It will be understood that all of the above enumerated elements are located or positioned in the lower housing section 4 and thus, when the upper housing section 3 is removed, an expended dispenser 17 may be readily removed from the holding fixture 16 and a new dispenser inserted therein.

Referring now particularly to FIG. 4, extending across the upper housing section 3 is a partition 19 having a recess 20 formed therein for accommodating the valve button 21 of pressurized dispenser 17. A lever member 24 is provided pivotally mounted as at 25 on a bracket 26 which in turn is mounted on the partition 19 on the side thereof remote from dispenser 17. Pivoted lever member 24 has its end 27 engaging a push-rod 28 which in turn extends through an opening 29 in partition 19 to engage valve button 21 of dispenser 17. A suitable coil spring 30 surrounds push-rod 28 extending between the upper surface of partition 19 and the end 27 of pivoted lever 24 thereby biasing the lever 24 into a first position, as shown in FIG. 4, in which the valve button 21 of dispenser 17 is not depressed.

An escapement wheel 33 is provided having an upwardly extending sleeve member 34 and a concentric flat cam surface 35 formed on its upper face. Referring particularly to FIGS. 2, 3 and 4, it will be observed that cam surface 35 has a semi-circular lift portion 36 concentrically surrounding sleeve member 34 and defining a dwell portion 37 intermediate its ends. As will now be seen in FIGS. 2 and 4, in the normal or "at rest" position of the device, the end 38 of pivoted lever member 24 is disposed in the dwell portion 37 between the ends of lift portion 36 of cam surface 35 and thus, coil spring 30 biases pivoted lever member 24 into its first or normal position in which valve button 21 of dispenser 17 is not depressed.

A recess 39 is provided in the upper surface of partition 19 of suitable size and depth to accommodate the esapement wheel 33 and a coil spring 40 is provided in the recess 39 having one end secured to the bottom face of escapement wheel 33 and its other end secured to the bottom of recess 39; coil spring 40 normally biases escapement wheel 33 into its operative position as seen in FIG. 4.

A shaft 42 is provided extending downwardly through opening 43 in the top portion 44 of upper housing section 3 and into sleeve member 34, as shown. Shaft member 42 is movable downwardly and upwardly, but is restrained against rotation by means of a key portion 45 formed on housing portion 44 cooperating with longitudinal slot 46 in the surface of shaft 42. A spiral groove 47 is formed on the lower extremity of shaft 42 and a pin 48 is secured in the wall of sleeve member 34 and extends into the groove 47. It will now be seen that since shaft 42 is restrained against rotation by sliding engagement of key 45 in longitudinally extending slot 46, downward motion of the shaft 42 will cause rotation of sleeve member 34 and thus of cam surface 35 and escapement wheel 33 in the direction shown by the arrow 50 (FIG. 2), by virtue of the cooperative engagement of the pin 48 in the spiral groove 47.

A knob 52 is provided positioned on the upper extremity 53 of shaft 42 on the side of housing portion 44 remote from escapement wheel 33, knob 52 having a slip-fit with shaft extension 53. A suitable coil spring 54 is provided surrounding shaft extension 53 with its ends respectively abutting the upper surface of housing portion 44 and the lower surface of knob 52. It will now be seen that shaft 42 may be moved downwardly thereby to rotate sleeve member 34, cam surface 35 and escapement wheel 33 by means of downward pressure exerted on knob 52, as shown by arrow 55. The extent of downward movement of knob 52 and thus of shaft 42 is determined by a cam surface 56 formed on the bottom surface of knob 52 which cooperates with an abutment 57 formed on the upper surface of housing portion 44.

Thus, knob 52 may be rotated on shaft extension 53 so that cam surface 56 assumes selectively variable positions with respect to abutment 57 so the extent of downward movement of shaft 42 and thus the degree of rotation of sleeve member 34, cam 35 and escapement wheel 33 is determined. It will further be readily comprehended, as will be hereinafter more fully described, that initial downward movement of knob 52 and shaft 42 is accompanied by compression of the coil spring 40, as best seen in FIG. 7, which moves escapement wheel 33 into the recess 39, the remainder of the downward movement of shaft 42 being accompanied by rotation of sleeve member 34, cam 35 and escapement wheel 33, as above described. It will also be observed that the rotation of sleeve member 34, cam 35 and escapement wheel 33 responsive to downward movement of shaft 42 also coils-up the coil spring 40.

Referring now additionally to FIGS. 3 and 5, it will immediately be comprehended that exertion of the downward force 55 on knob 52 thereby moving shaft 42 downwardly results in moving escapement wheel 33 downwardly into recess 39, compression of coil spring 40, rotation of sleeve 34, cam 35 and escapement wheel 33 and coiling-up of spring 40, the degree of rotation of cam 35 being determined by the extent of downward movement of shaft 42 which in turn is determined by the relationship of cam surface 56 of knob 52 with respect to abutment 57. This rotation of cam surface 35 moves lift portion 36 so that it is under end 38 of pivoted lever member 24. Thus, when the downward force 55 on the knob 52 is removed, spring 40 returns escapement wheel 33 to its operative position so that the lift portion 36 of cam 35 now moves pivoted lever member 24 to its second position, as best seen in FIG. 5, in which its end 27 depresses rod 28 against the force of spring 30 thereby depressing the valve knob 21 of dispenser 17 to initiate discharge of the instant beverage-making material 58 from spout 59 into the mixing chamber 13.

In accordance with my invention, I provide for timing the discharge of the beverage-making material from the dispenser 17 into the mixing chamber 13 by the means now to be described. It will be recalled that the downward movement of shaft 42 responsive to the force 55 exerted on knob 52 resulted in coiling-up of the spring 40. Spring 40 now tends to rotate escapement wheel 33 and thus cam 35 in the direction shown by the arrow 61, this rotation however being restrained and maintained at a predetermined rate by means of conventional escapement mechanism 62, shown here as comprising a pivoted escapement member 63, a balance wheel 64, and hair spring 65, as is well known in the art. Thus, it will be readily seen that the rate of return of escapement wheel 33 and cam 35 from its extreme position shown in FIG. 3, to its normal position as shown in FIG. 2, is dependent upon escapement 62, the total elapsed time of such return and thus the time during which the instant beverage-making material is discharged from dispenser 17 being determined by the degree of rotation of cam 35, this in turn being determined by the position of cam surface 56 of knob 52 with respect to abutment 57. It will be readily seen that as soon as coil spring 40 and escapement 62 return escapement wheel 33 and the cam 35 to the normal position as shown in FIG. 2, the end 38 of pivoted lever member 24 will again drop into the dwell portion 37 between the ends of lift portion 36 of cam 35 under the influence of spring 30, thus removing the depressive force on the valve button 21 of dispenser 17 provided by the push rod 30 and thus terminating the discharge of instant beverage-making material from dispenser 17. It will now be seen that the strength of the beverage mixed in the mixing chamber 13 is determined by the position of knob 52 with respect to abutment 57, and it will be readily comprehended that suitable calibration may be provided upon the upper surface of knob 52.

In order to properly proportion the amount of hot water injected into the mixing chamber 13, the arrangement now to be described is provided. Here, it will be seen that I have provided a handle assembly 67 having its top and bottom ends 68 and 69 secured to the lower section 4 of the housing 2 in any suitable manner. A suitable snap switch 70 is seated in a recess 71 in the top portion 68 of handle assembly 67, switch 70 being the type which is deactuated, i.e., its contacts opened, responsive to depression of its actuating button 72. It will be seen that leads 11 and 12 from the heating coil 7 are connected in series with snap switch 70 and external receptacle 73 by means of leads 74 extending through the handle 67. It will now be seen that when the actuating button 72 of snap switch 70 is depressed, the contacts of the switch 70 (not shown) are opened and thus the heating coil 7 will not be energized. Conversely, when the actuating button 72 of snap switch 70 is not depressed, the contacts of switch 70 are closed and thus heating coil 7 will be energized (assuming that a suitable external source of power is connected to the receptacle 73).

In order to actuate snap switch 70, I provide a reciprocal switch actuating member 75 having its end 76 adapted to extend through an opening 77 in the wall of upper housing section 3 and into handle cavity 71 to engage and depress actuating button 72 of snap switch 70. Reciprocal member 75 is disposed on the upper surface of partition 19 and passes through a guide and abutment member 78. The other end 79 of reciprocal member 75 is joined to a yoke member 81 which, as best seen in FIGS. 2 and 3, surrounds escapement wheel 33 and escapement mechanism 62, passing under pivoted lever member 24 between bracket 26 and the spring and pushrod assembly 28, 30. Mounted on the upper surface of yoke portion 81 and in alignment with the reciprocal member 75 by means of a suitable leaf spring 82 is a latch member 83. A suitable coil spring 84 surrounds a portion of reciprocal member 75, having its ends respectively abutting abutment 78 and the yoke 81.

Yoke 81 has a projection 85 formed thereon diametrically opposite from reciprocal member 75 and having a slot 86 formed therein. A float member 87 is provided in the mixing chamber 13 and having a rod 88 extending upwardly therefrom through opening 89 in partition 19. A wedge member 90 is positioned on the end of rod 88 removed from float 87 and cooperating with the slot 86 in projection 85, as will be hereinafter more fully described.

Turning now to FIGS. 2 and 6, which show the mechanism in the deactuated or "at rest" position, it will be seen that the latch member 83 rests upon the upper face of escapement wheel 33 with its end 92 abutting the side 93 of lift portion 36 of cam surface 35. Yoke 81 and reciprocal member 75 are thus biased against the force exerted by coil spring 84 into their first or normal positions so that end 76 of reciprocal member 75 extends through opening 77 in upper housing portion section 3 to engage and depress actuating button 72 of snap switch 70 thereby opening its contacts and deenergizing heating coil 7. It will be seen, however, with particular reference to FIG. 7, that when the initial downward force 55 is exerted on knob 52 thus moving escapement wheel 33 against the force of coil spring 40 into recess 39, latching member 83 will slip over the upper surface of lift portion 36 of cam 35 so that spring 84 will move yoke portion 81 and reciprocal member 75 into their second positions, as viewed in FIG. 3, thus moving the end 76 of reciprocal rod 75 away from the actuating button 72 of snap switch 70 (and out of recess 71 in the handle portion 68); releasing of the force exerted on actuating button 72 of snap switch 70 by the end 76 of reciprocal member 75 closes the contacts of switch 70 and thus energizes heating coil 70 thus to initiate heating of the water in cavity 6 and forcing of the same upwardly through conduit 9 into the mixing chamber 13, as hereinbefore described. It will further be seen, by reference to FIG. 8, that when the force 55 on knob 52 is released, thus permitting escapement wheel 33 to return to its operative position in engagement with escapement mechanism 62, latching member 83 remains in engagement with the upper surface of the lift portion 36 of cam 35, merely being tilted or cocked with respect to yoke portion 81 by means of leaf spring 82.

When the level of the fluid (the hot water from conduit 9 and the instant beverage-making material 58 from container 17) in the mixing chamber 13 reaches a predetermined level, as shown in dashed lines 94 in FIGS. 6 and 8, float 87 will be raised thus raising the wedge 90 forcing yoke portion 81 and reciprocal member 75 against the force exerted by spring 84 so that end 76 again depresses actuating button 72 of switch 70, thereby to deenergize heating coil 70 and to terminate the heating of the water and its supply to the mixing chamber 13 through conduit 9; movement of yoke portion 81 and reciprocal member 75 to the right, as viewed in FIGS. 6 and 8 under the influence of wedge 90 causes latching member 83 to return to its normal position as shown in FIGS. 2 and 6, i.e., resting upon the upper face of escapement wheel 33 and its end 92 in engagement with the side 93 of lift portion 36 of cam 35.

It will now be seen that after the mixed beverage in mixing chamber 13 is poured out of spout 14 thus permitting the float 87 to fall to its position as shown in solid lines in FIGS. 6 and 8, latching member 83 by virtue of its engagement with the side surface 93 of the lift portion 36 of cam 35 retains reciprocal member 75 in its position to maintain actuating button 72 of snap switch 70 depressed, thereby maintaining coil 7 in its deenergized condition awaiting the next actuation of the manually actuable knob 52. It will further be seen that all moving parts of my apparatus are mounted on the partition 19 in the upper housing section 3 and thus are removed therewith to permit cleaning of the lower section 4 and insertion and removal of the dispensers 17.

It will be readily seen that by the mere omission of a dispenser 17, my device may be employed for the rapid production of a sufficient quantity of hot water for the making of the conventional cup of tea, bouillon, etc. It will also be readily apparent that the device may be so designed that the mixing chamber 13 will accommodate two cups of mixed beverage or any other quantity desired.

It will now be readily seen that I have provided a device for automatically mixing and dispensing a measured quantity of hot beverage, the same being mixed from hot liquid produced by the device, and instant beverage-making material dispensed from a pressurized dispenser of such material accommodated by the device, all operations being actuated by a single control knob which may also be employed for determining the desired strength of the beverage. It will be readily apparent to those skilled in the art that the specific mechanism disclosed is by way of illustration and that other equivalent mechanisms may be readily employed. Thus, means other than the float 87 may be employed for sensing the fluid level in the mixing chamber 13 and for actuating the switch 70 responsive to the fluid level therein. It will also be readily apparent that other timing mechanisms well known in the art may be substituted for the escapement mechanism 62 and that other means for causing rotation of the cam 35 will occur to those skilled in the art, for example, cam 35 may be rotated by means of an appropriate one way clutch mechanism.

While I have illustrated and described a specific embodiment of my invention, further modifications and improvements will occur to those skilled in the art, and I desire in the appended claims, therefore, to cover all modifications which do not depart from the spirit and scope of this invention.

What is claimed is:

1. A hot beverage-making device comprising: a liquid supply reservoir; means for heating at least a portion of the liquid in said reservoir; a beverage mixing chamber; means communicating between said reservoir and said chamber for supplying liquid to the latter; a pressurized dispenser of instant beverage-making material having a material discharging opening and valve means for discharging the said material from said opening; means for removably holding said dispenser adjacent said mixing chamber so that said opening discharges said material directly into said chamber; manually actuated means engageable with said valve means for initiating discharge of said material into said chamber; and timing means actuated by said manually actuated means for terminating said discharge after a predetermined time thereby to discharge a predetermined quantity of material into said chamber.

2. A hot beverage-making device comprising: a liquid supply reservoir; means for heating at least a portion of liquid in said reservoir; a beverage mixing chamber; means communicating between such reservoir and said chamber for supplying liquid to the latter; a pressurized dispenser of instant beverage-making material having a material discharging opening and valve means for discharging the said material from said opening; means for removably holding said dispenser adjacent said mixing chamber so that said opening discharges said material directly into said chamber; manually actuated means engageable with said valve means for actuating the same to initiate discharge of said material into said container; timing means actuated by said manually actuated means for terminating said discharge after a predetermined time thereby to discharge a predetermined quantity of material into said chamber; means responsive to actuation of said manually actuated means for initiating a supply of liquid to said chamber; and means responsive to a predetermined fluid level in said chamber for terminating the supply of liquid to said chamber.

3. A hot beverage-making device comprising: a liquid supply reservoir; means for heating at least a portion of the liquid in said reservoir; a beverage mixing chamber; means communicating between said reservoir and said chamber for supplying liquid to the latter; a pressurized dispenser of instant beverage-making material having a material discharging opening and valve means for discharging said material from said opening; means for removably holding said dispenser adjacent said mixing chamber so that said opening discharges said material directly into said chamber; means engageable with said valve means for operating the same to cause said discharge therefrom; manually actuated means operatively connected to said operating means for initiating said discharge; means for initiating a supply of liquid to said chamber responsive to actuation of said manually actuated means; timing means actuated by said manually actuated means and operatively connected to said operating means for terminating said discharge after a predetermined time thereby to discharge a predetermined quantity of said material into said chamber; and means for terminating the supply of liquid to said chamber responsive to a predetermined fluid level therein.

4. A hot beverage-making device comprising; a liquid supply reservoir; means for heating at least a portion of the liquid in said reservoir; a beverage mixing chamber; passage means communicating between said liquid heating means and said chamber whereby liquid is supplied to said chamber responsive to said heating; a pressurized dispenser of instant beverage-making material having a material discharging opening and valve means for discharging the said material from said opening; means for removably holding said dispenser adjacent said mixing chamber so that said opening discharges said material directly into said chamber; manually actuating means engageable with said valve means for actuating the same to initiate discharge of said material into said chamber; timing means actuated by said manually actuated means for terminating said discharge after a predetermined time thereby to discharge a predetermined quantity of material into said chamber; means responsive to actuation of said manually actuated means for initiating said heating; and means responsive to predetermined fluid level in said chamber for terminating said heating thereby to terminate the supply of liquid to said chamber.

5. A hot beverage-making device comprising; a liquid supply reservoir; means for heating at least a portion of the liquid in said reservoir; a beverage mixing chamber; passage means communicating between said liquid heating means and said chamber whereby said liquid is supplied to said chamber responsive to said heating; a pressurized dispenser of instant beverage-making material having a material discharging opening and valve means for discharging the said material from said opening; means for removably holding said dispenser adjacent said mixing chamber so that said opening discharges said material directly into said chamber; means engageable with said valve means for operating the same to cause said discharge therefrom; means for actuating said heating means; manually actuated means operatively connected to said valve operating means and to said means for actuating said heating means for respectively initiating said material discharge and said heating; timing means actuated by said manually actuated means and operatively connected to said valve operating means for terminating said material discharge after a predetermined time thereby to discharge a predetermined quantity of said material into said chamber; and means responsive to a predetermined fluid level in said chamber and connected to said means for actuating said heating means for terminating said heating thereby to terminate the supply of liquid to said chamber.

6. A hot beverage-making device comprising: a liquid supply reservoir; means for heating at least a portion of the liquid in said reservoir; a beverage mixing chamber; means communicating between said reservoir and said chamber for supplying liquid to the latter; a pressurized dispenser of instant beverage-making material having a material discharging opening and a depressible valve for discharging the said material from said opening; means for removably holding said dispenser adjacent said mixing chamber so that said opening discharges said material directly into said chamber; a lever member arranged to engage said valve of said dispenser and to depress the same responsive to movement from a first position to a second position thereby to discharge said material into said chamber; rotatable cam means cooperating with said lever member and arranged to move the same from said first position to said second position thereof responsive to rotation from a normal position to an actuated position; manually actuated means for rotating said cam from said normal position to said actuated position thereof thereby to initiate said discharge, timing means connected to said cam means for returning the same from said actuated position to said normal position thereof thereby to terminate said discharge whereby a predetermined quantity of said material is discharged into said chamber; and means for terminating the supply of liquid to said chamber responsive to a predetermined fluid level therein.

7. A hot beverage-making device comprising: a liquid supply reservoir; means for heating at least a portion of the liquid in said reservoir; a beverage mixing chamber; passage means communicating between said liquid heating means and said chamber whereby liquid is supplied to said chamber responsive to said heating; a pressurized dispenser of instant beverage-making material having a material discharging opening and valve means for discharging the said material from said opening; means for removably holding said dispenser adjacent said mixing chamber so that said opening discharges said material directly into said chamber; manually actuated means engageable with said valve means for actuating the same to initiate discharge of said material into said container; timing means actuated by said manually actuated means for terminating said discharge after a predetermined time thereby to discharge a predetermined quantity of material into said chamber; switch means connected to energize said heating means; means for actuating said switch means; means responsive to actuation of said manually actuated means for latching said switch actuating means in a position to actuate said switch means thereby to energize said heating means and to initiate said liquid heating; and means responsive to a predetermined fluid level in said chamber and connected to said switch actuating means for releasing said latching means thereby to de-actuate said switch means and to terminate said heating and liquid supply to said chamber.

8. A hot beverage-making device comprising: a liquid supply reservoir; means for heating at least a portion of the liquid in said reservoir; a beverage mixing chamber; means communicating between said reservoir and said chamber for supplying liquid to the latter; a pressurized dispenser of instant beverage-making material having a material discharging opening and a depressible valve for discharging the said material from said opening; means for removably holding said dispenser adjacent said mixing chamber so that said opening discharges said material directly into said chamber; a pivoted lever member having one end arranged to engage said valve of said dispenser and to depress the same responsive to movement from a first position to a second position thereby to discharge said material into said chamber; a rotatable member having a cam surface formed thereon, the other end of said lever member cooperatively engaging said cam surface, said rotatable member having a normal position with said lever member in said first position thereof whereby said dispenser valve is not depressed, said rotatable member being rotatable from said normal position to a selectively predetermined second position thereby causing said cam surface to move said lever member to said second position thereof thereby to depress said dispenser valve and to initiate discharge of said material into said chamber; manually actuated means for rotating said rotatable member from said normal position to said second position thereof; timing means connected to said rotatable member for returning the same from said second position to said normal position thereof at a predetermined rate thereby to terminate said discharge whereby a predetermined quantity of said material is discharged into said chamber, and means for terminating the supply of liquid to said chamber responsive to a predetermined fluid level therein.

9. A hot beverage-making device comprising: a liquid supply reservoir; means for heating at least a portion of the liquid in said reservoir; a beverage mixing chamber; passage means communicating between said liquid heating means and said chamber whereby liquid is supplied to said chamber responsive to said heating; a pressurized dispenser of instant beverage-making material having a material discharging opening and a depressible valve for discharging the said material from said opening; means for removably holding said dispenser adjacent said mixing chamber so that said opening discharges said material into said chamber; a pivoted lever member having one end arranged to engage said valve of said dispenser and to depress the same responsive to movement from a first position to a second position thereby to discharge said material into said chamber; a rotatable member having a cam surface formed thereon, the other end of said lever member cooperatively engaging said cam surface, said rotatable member having a normal position with said lever member in said first position thereof whereby said dispenser valve is not depressed, said rotatable member being rotatable from said normal position to a selectively predetermined second position thereby causing said cam surface to move said lever member to said second position thereof thereby to depress said dispenser valve and to initiate discharge of said material into said chamber; manually actuated means for rotating said rotatable member from said normal position to said second position thereof; timing means connected to said rotatable member for returning the same from said second position to said normal position thereof at a predetermined rate thereby to terminate said discharge whereby a predetermined quantity of said material is discharged into said chamber; switch means connected to energize said heating means; a reciprocal member movable between first and second positions and having one end arranged to actuate said switch means in said second position thereof thereby to initiate said heating and liquid supply; a latching member pivotally connected to the other end of said reciprocal member and having a normal position engaging said rotatable member thereby positioning said reciprocal member in said first position thereof; said latching member being movable to a second position engaging said cam surface responsive to actuation of said manually actuated means thereby moving said reciprocal member to said second position thereof to actuate said switch whereby said heating and liquid supply are initiated; and means responsive to a predetermined fluid level in said chamber arranged to move said reciprocal member to said first position thereof thereby returning said latching member to said normal position thereof and terminating said heating and liquid supply to said chamber.

10. A hot beverage-making device comprising: a liquid supply reservoir; means for heating at least a portion of the liquid in said reservoir; a beverage mixing chamber; passage means communicating between said liquid heating means and said chamber whereby liquid is supplied to said chamber responsive to said heating; a pressurized dispenser of instant beverage-making material having a material discharging opening and a depressible valve for discharging the said material from said opening; means for removably holding said dispenser adjacent said mixing chamber so that said opening discharges said material directly into said chamber; a pivoted lever member having one end arranged to engage said valve of said dispenser and to depress the same responsive to movement from a first position to a second position thereby to discharge said material into said chamber; a rotatable escapement wheel; a flat cam surface formed on one face of said wheel and having a lift portion and a dwell portion; spring means normally biasing the other end of said lever member into cooperative engagement with said cam surface; a coil spring secured to the other face of said wheel and normally biasing the same into operative position; said wheel having a normal position with said lever member in said first position and with the said other end thereof engaging said dwell portion of said cam surface whereby said dispenser valve is not depressed; said wheel having a sleeve member secured to said one face thereof; a manually depressible shaft member cooperable with said sleeve member so that downward pressure on said shaft member moves said wheel downwardly against said coil spring out of said operative position, said sleeve member being arranged so that said downward shaft movement coils said coil spring and rotates said wheel to a selectively predetermined position, release of said pressure on said shaft member permitting said coil spring to return said wheel to said operative position thereof with said lift portion of said cam surface engaging said other end of said lever member and moving the same to said second position thereof thereby depressing said dispenser valve to initiate said discharge of said material into said chamber; escapement means cooperating with said escapement wheel whereby said coil spring returns said wheel from said predetermined position to said normal position thereof at a predetermined rate thereby terminating said material discharge so that a predetermined quantity of said material is discharged into said chamber; switch means connected to energize said heating means; a reciprocal member movable between first and second positions and having one end arranged to actuate said switch means in said second position thereof thereby to initiate said heating and water supply; spring means normally biasing said reciprocal member toward said second position thereof; a latching member having one end pivotally connected to the other end of said reciprocal member and having a normal position with its other end abutting the side of said lift portion of said cam surface thereby positioning said reciprocal member in said first position thereof; said latching member being movable to a second position engaging said lift portion of said cam surface responsive to said downward movement of said wheel thereby permitting movement of said reciprocal member to said second position thereof to actuate said switch whereby said heating and liquid supply is initiated; and means including a float in said chamber responsive to a predetermined fluid level therein arranged to move said reciprocal member to said first position thereof thereby returning said latching member to said normal position thereof and terminating said heating and liquid supply to said chamber.

11. A device for employing a pressurized dispenser of instant beverage-making material in the making and dispensing of a predetermined quantity of hot beverage, said dispenser being of the type having a material dispensing opening and valve means which when actuated discharges material from said opening, said device comprising: a housing having formed therein a liquid supply reservoir, a beverage mixing chamber, and a compartment for removably holding a dispenser, said housing having a pouring spout communicating with said chamber, said compartment being positioned adjacent said chamber and communicating therewith whereby material is discharged from said dispenser directly into said chamber; means in said housing for heating at least a portion of the liquid in said reservoir; means communicating between said reservoir and said chamber for supplying liquid to the latter; and manually actuated means on said housing communicating with said compartment for engaging said dispenser valve means thereby to initiate discharge of said material, said manually actuated means including timing means for terminating said discharge after a predetermined time.

12. A device for employing a pressurized dispenser of instant beverage-making material in the making and dispensing of a predetermined quantity of hot beverage, said dispenser being of the type having a material discharging opening and valve means for discharging said material from said opening, said device comprising: a housing having formed therein a liquid supply reservoir, a beverage mixing chamber, and a compartment for removably accommodating a dispenser, said compartment being adjacent said chamber and communicating therewith whereby material is discharged from said dispenser valve directly into said chamber; means in said housing for heating at least a portion of the liquid in said reservoir; passage means communicating between said liquid heating means and said chamber whereby liquid is supplied to said chamber responsive to said heating; a cover for said compartment removably closing the same; means on said cover member for actuating said heating means; means on said cover member and communicating with said compartment for engaging said valve means and operating the same thereby to initiate discharge of said material into said chamber; manually actuated means on said cover member operatively connected to said valve operating means and to said heating means actuating means for respectively actuating the same; timing means on said cover member actuated by said manually actuating means and operatively connected to said valve operating means for actuating the same thereby to terminate said material discharge after a predetermined time; and means on said cover member connected to said heating means actuating means for terminating said heating thereby to terminate the supply of said liquid to said chamber responsive to a predetermined fluid level therein.

References Cited in the file of this patent

UNITED STATES PATENTS

| | | |
|---|---|---|
| 1,470,584 | Kreutz | Oct. 9, 1923 |
| 2,149,270 | Burgess | Mar. 7, 1939 |
| 2,452,933 | Joppich et al. | Nov. 2, 1948 |
| 2,569,820 | Locke | Oct. 2, 1951 |
| 2,597,063 | Catanzano | May 20, 1952 |
| 2,663,477 | Bendz | Dec. 22, 1953 |
| 2,712,887 | King | July 12, 1955 |
| 2,772,812 | Booth | Dec. 4, 1956 |
| 2,912,143 | Woolfolk | Nov. 10, 1959 |